US008934141B2

United States Patent
Hagiwara et al.

(10) Patent No.: US 8,934,141 B2
(45) Date of Patent: Jan. 13, 2015

(54) IMAGE PROCESSING SYSTEM, IMAGE FORMING APPARATUS, AND METHOD OF CONTROLLING USE OF MEDIUM

(75) Inventors: Takahiro Hagiwara, Chiba-ken (JP); Kazunori Hirabayashi, Kanagawa-ken (JP); Shunichi Megawa, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 44 days.

(21) Appl. No.: 13/611,275

(22) Filed: Sep. 12, 2012

(65) Prior Publication Data
US 2013/0070266 A1 Mar. 21, 2013

Related U.S. Application Data

(60) Provisional application No. 61/536,202, filed on Sep. 19, 2011.

(51) Int. Cl.
| H04N 1/40 | (2006.01) |
| B41J 13/00 | (2006.01) |
| G03G 15/00 | (2006.01) |
| G06K 15/00 | (2006.01) |

(52) U.S. Cl.
CPC ......... B41J 13/0009 (2013.01); G03G 15/6585 (2013.01); G03G 15/6588 (2013.01); G06K 15/4065 (2013.01)
USPC .......................................... 358/2.1; 358/468

(58) Field of Classification Search
USPC ........ 358/1.9, 2.1, 468, 448, 1.15–1.16, 1.18, 358/1.7
See application file for complete search history.

(56) References Cited

U.S. PATENT DOCUMENTS

2011/0199625 A1* 8/2011 Sugimoto et al. ............... 358/1.9
2012/0147398 A1* 6/2012 Iguchi et al. .................... 358/1.9

FOREIGN PATENT DOCUMENTS

| JP | 2005-032004 | | 2/2005 |
| JP | 2006284794 A | * | 10/2006 |
| JP | 2007-101966 | | 4/2007 |
| JP | 2009198974 A | * | 9/2009 |

* cited by examiner

Primary Examiner — Thomas D Lee
Assistant Examiner — Stephen M Brinich
(74) Attorney, Agent, or Firm — Amin, Turocy & Watson, LLP

(57) ABSTRACT

A system includes a receiving unit and a controller. The receiving unit receives data about the number of processes performed in an image forming unit to form an image with a decolorable color material and data about the number of processes performed in a decolorizing unit to decolorize an image formed with the decolorable color material. Based on the data received by the receiving unit the controller calculates the number of media in user's use in a condition after they are subjected to image formation by the image forming unit and before they are decolorized by the decolorizing unit. The controller deters image formation by the image forming unit if the number of the media in user's use exceeds a first threshold, and allows the image forming unit to form an image if the number of the media in user's use does not exceed the first threshold.

19 Claims, 12 Drawing Sheets

$\underbrace{\text{MMMMM}}_{\text{DEVICE CODE}} - \underbrace{\text{99999999}}_{\text{SERIAL NUMBER}}$

MACHINE-READABLE CODE
(MEDIUM'S ID)

FIG.12

| MEDIUM'S ID | USER'S ID | DATE AND TIME OF USE |
|---|---|---|
| MFP01-00000001 | USER001 | 2010/04/03 10:03:05 |
| MFP01-00000002 | USER001 | 2010/04/03 10:03:05 |
| MFP01-00000003 | USER001 | 2010/04/03 10:03:06 |
| MFP01-00000008 | USER003 | 2010/04/05 08:22:45 |
| MFP02-00000011 | USER008 | 2010/04/06 13:43:25 |
| MFP02-00000012 | USER008 | 2010/04/06 13:43:25 |
| MFP02-00000013 | USER008 | 2010/04/06 13:43:25 |
| MFP03-00000028 | USER010 | 2010/04/10 09:33:33 |
| MFP05-00000028 | USER001 | 2010/04/11 17:07:11 |
| MFP01-00000040 | USER003 | 2010/04/08 14:02:32 |
| MFP01-00000041 | USER003 | 2010/04/08 14:02:32 |
| : | : | : |

FIG.13

| USER'S ID | CUMULATIVE SUM OF NEW MEDIA HAVING BEEN USED | CUMULATIVE SUM OF REUSABLE MEDIA HAVING BEEN USED | THE NUMBER OF MEDIA HAVING BEEN SUBJECTED TO DECOLORIZING PROCESS |
|---|---|---|---|
| USER001 | 133 | 529 | 230 |
| USER002 | 28 | 200 | 192 |
| USER003 | 212 | 382 | 491 |
| USER004 | 100 | 13 | 53 |
| USER005 | 299 | 459 | 310 |
| : | : | : | : |

FIG.14

| DEVICE'S ID | MAXIMUM NUMBER OF NEW MEDIA TO BE STORED | MAXIMUM NUMBER OF REUSABLE MEDIA TO BE STORED |
|---|---|---|
| MFP01 | 500 | 3000 |
| MFP02 | 500 | 2000 |
| ERS01 | 0 | 500 |
| MFP03 | 1500 | 3500 |
| ERS02 | 0 | 500 |
| : | : | : |

FIG.15

| SETTING ITEM | SET VALUE |
|---|---|
| LOWER LIMIT OF VARYING MARGIN | −30% |
| UPPER LIMIT OF VARYING MARGIN | +20% |
| TARGET NUMBER OF TIMES OF REUSE OF MEDIUM | 3 |
| NUMBER OF USERS | 10 |
| : | : |

FIG.16

| TYPE OF PRINTING MEDIUM | CUMULATIVE SUM OF MEDIA HAVING BEEN USED |
|---|---|
| NEW MEDIUM | 1290 |
| PRESUMPTIVE REUSABLE MEDIUM | 562 |
| REUSABLE MEDIUM | 2380 |
| REJECTED MEDIUM | 138 |

IMAGE PROCESSING SYSTEM, IMAGE FORMING APPARATUS, AND METHOD OF CONTROLLING USE OF MEDIUM

CROSS-REFERENCE TO RELATED APPLICATIONS

This application is based upon and claims the benefit of priority from: U.S. provisional application 61/536,202, filed on Sep. 19, 2011; the entire contents all of which are incorporated herein by reference.

FIELD

Embodiments described herein relate generally to a technique of managing the number of printing media such as sheets of paper to be used and limiting the use of printing media.

BACKGROUND

There have been a management system and a device capable of grasping the number of printing media (hereinafter simply called media) such as sheets of paper for each feeding tray.

There has also been a print system that makes a print on a medium with a decolorable toner, and decolorizes a toner on a used medium by using a decolorizing device with the intension to reuse the used medium (such a print system is hereinafter called an eco-print system).

When employed in the eco-print system, the conventional management system is capable of grasping the number of new media (unused media that have never been employed for printing) and the number of decolorized reusable media. However, if a larger quantity of media is distributed in response to the use of new media and accordingly the capacity of a storing tray of an image forming apparatus or a decolorizing device to hold media is exceeded considerably, a place to store decolorized media is required to be prepared separately. This becomes an obstacle to the operation of sheets.

DESCRIPTION OF THE DRAWINGS

FIG. 12 shows an example of a table which is stored in a server device and manages a medium's ID;

FIG. 13 shows an example of a table which is stored in the server device and manages the number of used media and the number of media having been subjected to decolorizing process for each user;

FIG. 14 shows an example of a table which is stored in the server device and manages an admissible storing quantity of a tray of each device;

FIG. 15 shows an example of a table which is stored in the server device and manages a parameter;

FIG. 16 shows an example of a table which is stored in the server device and manages the quantity of media in the entire system.

DETAILED DESCRIPTION

An image processing system of an embodiment includes a receiving unit and a controller. The receiving unit receives data about the number of processes performed in an image forming unit to form an image on a medium with a decolorable color material and data about the number of processes performed in a decolorizing unit to decolorize an image on a medium formed with the decolorable color material. The controller calculates the number of media in user's use in a condition after they are subjected to image formation by the image forming unit and before they are decolorized by the decolorizing unit on the basis of the data received by the receiving unit. The controller deters image formation by the image forming unit if the number of the media in user's use exceeds a previously set first threshold, and allows image formation by the image forming unit if the number of the media in user's use does not exceed the first threshold.

The embodiment provides a technique which is adopted in an eco-print system that uses reusable media, manages the quantity of distribution of media to be used and limits the quantity of media to be used. In the description given below, a "medium" is a sheet medium which is, for example, a sheet of paper. A sheet medium is not only a sheet of paper but it may also be a plastic or fabric sheet.

Figure 1:
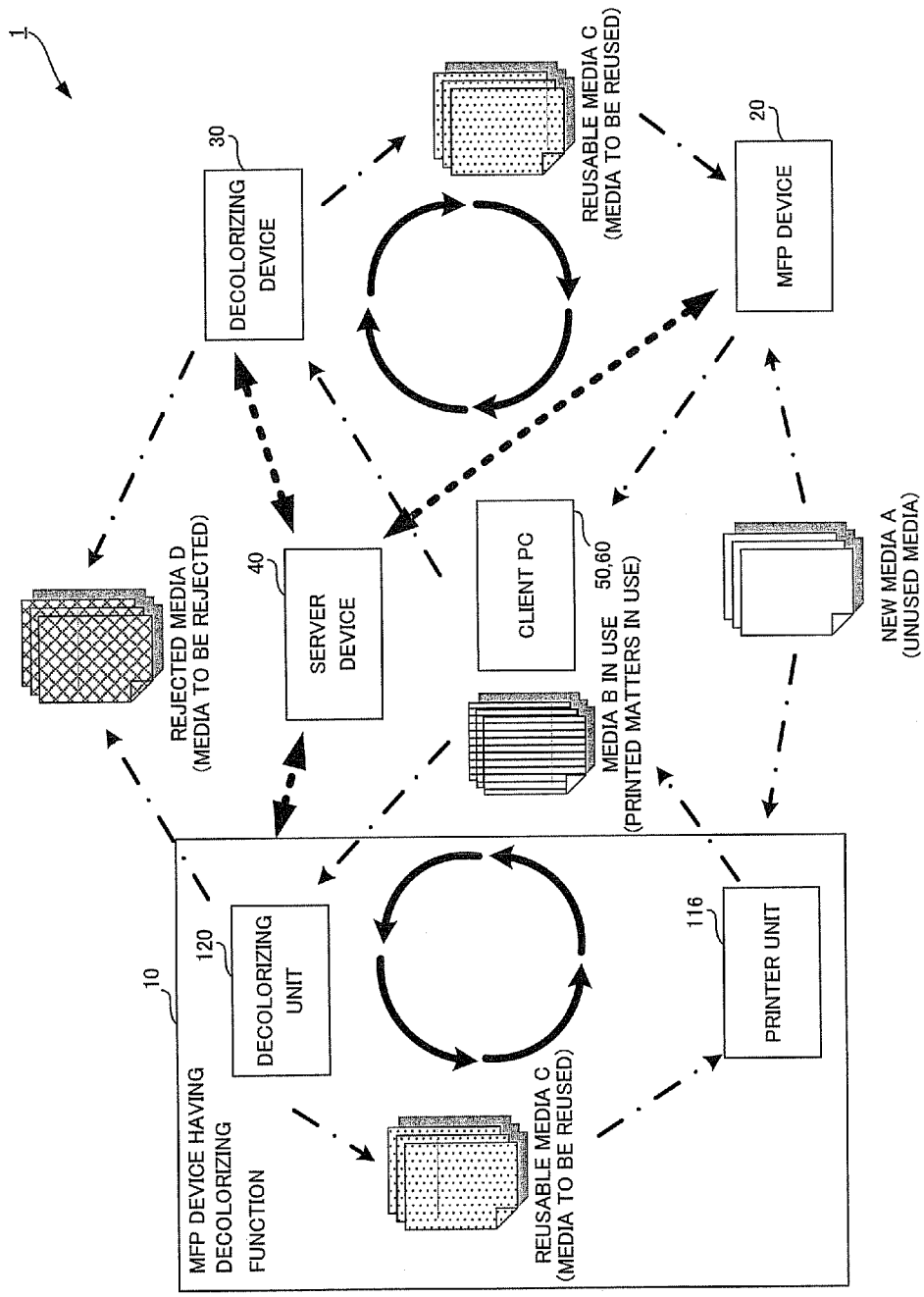
FIG. 1 shows an example of a cycle of media provided by an eco-print system.

An eco-print system of the embodiment and a cycle of media provided by the eco-print system of the embodiment will be described first with reference to FIG. 1. In FIG. 1, dashed arrows in bold type show flows of media management information, and dashed arrows with dots show flows of media.

The eco-print system 1 includes an MFP (multi-function peripheral) device 10 having a decolorizing function, an MFP device 20, a decolorizing device 30, a server device 40, and client PCs (personal computers) 50 and 60. The MFP device 10 having a decolorizing function may be omitted. Or, either the MFP device 20 or the decolorizing device 30, or both the MFP device 20 and the decolorizing device 30 may be omitted. Further, a plurality of MFP devices 10 each having a decolorizing function, a plurality of MFP devices 20, and a plurality of decolorizing devices 30 may be provided. Additionally, there is no limit on the number of server devices 40 and client PCs 50 (60).

The MFP device 20 makes a print on a medium by using a toner (color material) that is decolorized if being heated to a certain temperature or higher. The decolorizing device 30 erases (decolorizes) an image by heating a medium on which the image has been formed with the decolorable toner to the certain temperature or higher. The MFP device 10 having a decolorizing function includes a decolorizing unit 120 and a printer unit 116. The MFP device 10 implements the aforementioned functions of the MFP device 20 and the decolorizing device 30 in one casing. The MFP device 10 having a decolorizing function is capable of making a print immediately after decolorization, and is also capable of performing only decolorization or printing.

The server device 40 stores data about the number of media and the like, and manages the number of media used by each user. The client PCs 50 and 60 are used by users in order to create print jobs to obtain printed matters.

New media A shown in FIG. 1 are unused media that have never been employed for printing. The new media A are printed by the MFP device 20 or the printer unit 116 of the MFP device 10 having a decolorizing function to become media B in use used by a user (media in user's use).

If being determined to be unnecessary by a user, the media B in use are decolorized by the decolorizing device 30 or the decolorizing unit 120 of the MFP device 10 having a decolorizing function. Then, the media B are classified into reusable media C that can be reused, and rejected media D that cannot be reused for the presence of stains or bends or for a reason such as erasing failure.

The decolorized reusable media C are accumulated on a discharge tray of the decolorizing device 30 or a media storing tray provided in the MFP device 10 having a decolorizing function, and are used again for printing by the MFP device 20 or the printer unit 116.

As described above, media printed by the MFP device 20 or the printer unit 116 are used as the media B by a user for a while. Then, when the media become unnecessary, the decolorizing device 30 or the decolorizing unit 120 decolorizes the toner printed on the media with the intension to reuse the media. The eco-print system 1 repeats this cycle (see arrows in a circle of FIG. 1).

In the initial stage of the cycle of the eco-print system 1, there are not many reusable media C, so that the new media A are supplied and used for a certain period of time. If the media B are used by a user for a longer period of time until they are made to be reusable by the decolorizing device 30 or the decolorizing unit 120, the new media A are supplied for a longer period of time, leading to a larger quantity of used media. If the media B used by a user are left and do not become reusable but they are subjected to decolorizing process together at the time of big cleanup, for example, the processing capacity of the decolorizing device 30 or the decolorizing unit 120 is exceeded. In this case, the media B not having been subjected to decolorizing process or the reusable media C generated as a result of decolorization cannot be stored on a tray and are piled up in large quantities.

Thus, the embodiment provides a system capable of managing and operating media in a manner that avoids use of media by a user more than what is necessary to solve the previously discussed problem and to suppress the quantity of new media to be used.

According to the embodiment, media are managed and controlled properly in an eco-print system that decolorizes media printed with a decolorable toner to reuse the decolorized media, thereby preventing use of media that leads to considerable excess of the capacity of a storing tray and the like of an MFP device or a decolorizing device to hold media.

According to the embodiment, further, a user is notified of the presence of a medium not being reused by the user to be urged to reuse this medium. This suppresses the quantity of new media to be used to cut down waste of material consumption.

Figure 2:
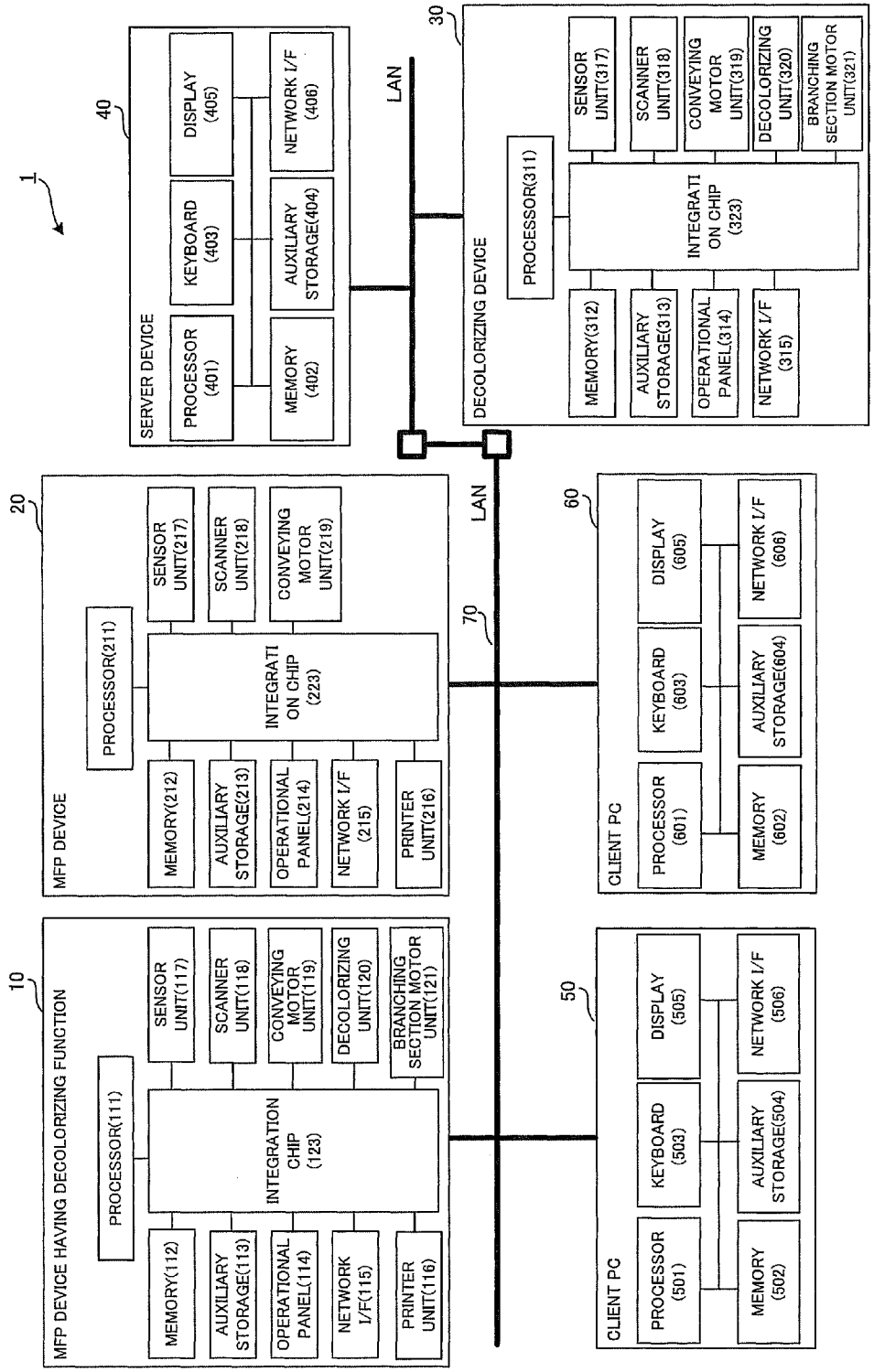
FIG. 2 shows an example of the structure of the eco-print system of an embodiment.

Next, an example of the structure of the eco-print system 1 is shown in FIG. 2. All the devices in the eco-print system 1 are capable of transmitting and receiving data to and from each other through a LAN (local area network) 70.

The MFP device 10 having a decolorizing function is a complex machine that performs scanning, copying, printing, and transmission and receipt by facsimile communication. The MFP device 10 having a decolorizing function makes a print with a decolorable toner in response to instructions for printing from the client PC 50 or 60, or by using its copying function. The MFP device 10 having a decolorizing function erases (decolorizes) an image on a medium by heating the used medium to a certain temperature or higher. Further, the MFP device 10 having a decolorizing function scans a medium having been subjected to decolorizing process to determine if this medium is reusable or not. If determined to be reusable, the medium is conveyed to a tray on which reusable media are accumulated. If determined not to be reusable, the medium is conveyed to a tray on which rejected media are accumulated.

The MFP device 10 having a decolorizing function includes a processor 111 being an arithmetic processing unit such as a CPU (central processing unit), a memory 112 being a main storage, and an auxiliary storage 113 such as a hard disk drive. The MFP device 10 having a decolorizing function further includes an operational panel 114 on which instructions from a user are accepted and on which an execution state, a confirmation screen and the like are displayed, and a network I/F 115 that makes communications with an external unit through a LAN.

The MFP device 10 having a decolorizing function includes the printer unit 116 that forms an image on a medium with a decolorable toner, and a sensor unit 117 that detects the quantity of media on a tray, and also detects the position of a medium and the like traveling in the device. The MFP device 10 having a decolorizing function includes a scanner unit 118 that reads an image on a document medium. The scanner unit 118 also scans a medium before being subjected to decolorization to create electronic data about an image formed on the medium. The scanner unit 118 further scans a medium having been subjected to decolorizing process to obtain image data to be used for determination as to the reusability of the medium.

The MFP device 10 having a decolorizing function includes a conveying motor unit 119 used to convey a medium into the device and to control the conveyance. The MFP device 10 having a decolorizing function includes the decolorizing unit 120 that erases an image on a medium by heating the medium to a certain temperature or higher. The MFP device 10 having a decolorizing function further includes a branching section motor unit 121. Based on determination as to if media having been subjected to decolorizing process are reusable or not, the branching section motor unit 121 classifies the media into reusable media and rejected media.

The MFP device 10 having a decolorizing function includes an integration chip 123 being a chip (board) to integrate the aforementioned internal units. The units inside the device give and receive control signals and data to and from each other through the integration chip 123.

The MFP device 20 is a complex machine that performs scanning, copying, printing, and transmission and receipt by facsimile communication. Like the MFP device 10 having a decolorizing function, the MFP device 20 makes a print of a document with a decolorable toner in response to instructions for printing from the client PC 50 or 60, and makes a copy of a document image with a decolorable toner.

The MFP device 20 includes a processor 211, a memory 212, an auxiliary storage 213, an operational panel 214, a network I/F 215, a printer unit 216, a sensor unit 217, a scanner unit 218, a conveying motor unit 219, and an integration chip 223. These units operate in the same manners as or similar manners to the corresponding units described with reference to the MFP device 10 having a decolorizing function.

The decolorizing device 30 is a device having a function to erase (decolorize) an image formed on a medium. The decolorizing device 30 decolorizes a toner image formed on a medium by heating the medium to a certain temperature or higher. Further, the decolorizing device 30 causes a scanner unit 318 to scan an image on a medium before being subjected to decolorization to convert the image to image data (electronic data). The decolorizing device 30 also causes the scanner unit 318 to scan the medium having been subjected to decolorizing process to make determination as to the reusability of the medium.

The decolorizing device 30 includes a processor 311, a memory 312, an auxiliary storage 313, an operational panel 314, a network I/F 315, a sensor unit 317, the scanner unit 318, a conveying motor unit 319, a decolorizing unit 320, a branching section motor unit 321, and an integration chip 323. These units operate in the same manners as or similar manners to the corresponding units described with reference to the MFP device 10 having a decolorizing function.

The server device 40 is a computer that accumulates image data before being subjected to decolorization obtained by scanning by the scanner unit 118 of the MFP device 10 having a decolorizing function or the scanner unit 318 of the decolorizing device 30, analyzes images, and manages media information containing IDs (identifications) of media, the quantity of distribution of media, and the like.

The client PCs 50 and 60 are computers that transmit document data created by a document creation application installed in advance on the client PCs 50 and 60 and image data created by an image editing application installed in advance on the client PCs 50 and 60 to the MFP device 20, for example, and give instructions for printing.

The client PCs 50 and 60, and the server device 40 have their internal hardware structures shown in FIG. 2. These internal hardware structures are the same as that of an existing computer, and they will not be described here. If there is a need hereinafter to describe the units in each device, they are identified with reference numerals in parentheses shown in each block.

Based on a parameter entered by a system administrator, the eco-print system 1 calculates a threshold to limit the quantity of media available to a user, for example. The parameter includes the quantity of reusable media which can be stored in the decolorizing device 30, the MFP device 10 having a decolorizing function and the MFP device 20, a varying margin of reusable media to be distributed, a target number of times of reuse of a medium, and the number of users of the system, for example. How the parameter is calculated will be described as follows. Some of the parameters may be acquired automatically from a unit being used. In the present embodiment, the server device 40 calculates the threshold. However, the embodiment is not limited thereto. The following numerical values and calculating formulas are given merely as examples.

(Entered Parameters or Acquired Parameters)

Maximum storage capacity of new media tray: 1000 (this numerical value can be acquired from a device)

Maximum storage capacity of reusable media tray: 2000 (this numerical value can be acquired from a device)

Varying margin of reusable media tray: from −30% (lower limit) to +20% (upper limit)

Target number of times of reuse of a medium: three times

The number of users of the system: ten (Calculating Formulas to Obtain Limit Values and Exemplary Calculations)

Upper limit of the quantity of media (media B in use shown in FIG. 1) available to a user (first threshold) is obtained as follows:

$$(\text{maximum storage capacity of reuseable media tray}) \times$$
$$(1 + \text{upper limit of varying margin of reusable media tray}) /$$
$$(\text{the number of users}) = 2000 \times (1 + 0.2)/10 = 240 \text{ per user}$$

Upper limit of the quantity of new media (new media A shown in FIG. 1) available to a user (second threshold) is obtained as follows:

$$(\text{upper limit of the quantity of media avaiable to a user})/$$
$$(\text{target number of times of reuse of a medium}) =$$
$$240(\text{per user})/3 = 80 \text{ per user}$$

It is seen from above that the system controls such that a user can conduct work by using up to 240 media, and that the user can use 80 new media out of the 240 media.

The eco-print system 1 uses the calculated limit values to control the number of media available to a user. Examples of the control are described below.

In the present embodiment, the substance of the control differs between the case where there are not many reusable media when the eco-print system 1 is in the initial stage of its operation, for example, and the case where there are reusable media in sufficient quantities when the eco-print system 1 is managed stably. Even if the quantity of media on the reusable media tray at the time when the eco-print system 1 is in the initial stage of its operation falls below the lower limit of the margin of the maximum storage capacity of the reusable media tray (2000×(1−0.3)), the substance of the control still differs depending on whether the quantity of media being used by a user exceeds the upper limit of media in use (aforementioned value of 240 per user) or not. If the upper limit of media in use by a user is not exceeded, the user is allowed to use media up to the quantity determined by the upper limit of media in use regardless of if the user uses new media or reusable media. Meanwhile, if the upper limit of media in use by the user is exceeded, the system controls such that the user becomes unable to use both new media and reusable media, and that the user is allowed to use only a quantity of media being used (media B in use shown in FIG. 1) after the media are decolorized to become reusable. The substance of the control described above is summarized as follows:

(First Control)

First control is provided if the quantity of media on the reusable media tray falls below the lower limit of the margin of the maximum storage capacity of the reusable media tray.

(1-1) If the upper limit of media in user's use is not exceeded, regarding limitation on use of new media by the user, the user is allowed to use new media without limitation, and regarding limitation on use of reusable media by the user, the user is allowed to use reusable media without limitation.

(1-2) If the upper limit of media in use by a user is exceeded, regarding limitation on use of new media by the user, the user is prohibited from using new media until the quantity of media in user's use becomes the same as or smaller than the upper limit of media in use, and regarding limitation on use of reusable media by the user, the user is prohibited from using reusable media until the quantity of media in use by the user becomes the same as or smaller than the upper limit of media in use.

A description will now be given of the case where the quantity of media on the reusable media tray does not fall below the lower limit of the margin of the maximum storage capacity of the reusable media tray. Control provided in this case is to suppress use of new media. Described first is the case where the upper limit of media in use by a user is exceeded. In this case, control is provided such that the user becomes unable to use both new media and reusable media, and that the user is allowed to use only a quantity of media being used after the media are subjected to decolorizing process to become reusable. Described next is the case where the upper limit of media in use by a user is not exceeded. In this case, determination is made as to if the upper limit of the quantity of new media (80 per user) available to a user is exceeded or not. If the upper limit of use of new media by a user is not exceeded, the user is allowed to use new media up to a quantity determined by this upper limit. If the upper limit of use of new media by a user is exceeded, the user is allowed to use only reusable media. A summation of the number of new media having been used (count-up) is started at a time when the quantity of media on the reusable media tray exceeds lower limit of the margin of the maximum storage capacity of the reusable media tray. At a time when the quantity of media on the reusable media tray falls below the lower limit of the margin, counts of all users are reset. Thus, if the upper limit of the quantity of new media available to a user is reached, the user is prohibited from using new media until the quantity of media on the reusable media tray becomes the same as or smaller than the lower limit of the margin of the maximum storage capacity of the reusable media tray. The substance of the control described above is summarized as follows:

(Second Control)

Second control is provided if the quantity of media on the reusable media tray (media in the same condition as those of the media C shown in FIG. 1) (third value) does not fall below the lower limit of the margin of the maximum storage capacity of the reusable media tray.

(2-1) If the upper limit of media in use by a user is not exceeded, regarding limitation on use of new media by the user, the user is allowed to use new media without limitation if the upper limit of use of new media by the user is not exceeded, and the user is prohibited from using new media until a count is reset if the upper limit of use of new media by the user is exceeded, and regarding limitation on use of reusable media by the user, the user is allowed to use reusable media without limitation.

(2-2) If the upper limit of media in use by a user is exceeded, regarding limitation on use of new media by the user, the user is prohibited from using new media until the quantity of media in use by the user becomes the same as or smaller than the upper limit of media in use, and regarding limitation on use of reusable media by the user, the user is prohibited from using reusable media until the quantity of media in use by the user becomes the same as or smaller than the upper limit of media in use.

In some cases, the first and second controls do not work sufficiently, so that an obstacle is placed to the fulfillment of a user' task. In response, the total quantity of new media the user used in the past and the total quantity of reusable media the user used in the past are obtained. If a condition that the reusable media are used the number of times not falling below the target number of times of reuse of a medium is satisfied, control may be provided to allow the user to use new media. In this case, the following control is exemplified:

(Third Control)

Third control is provided if the quantity of new media a user used in the past and the quantity of reusable media the user used in the past are, for example, expressed as follows:

Cumulative sum of new media having been used: 100

Cumulative sum of reusable media having been used: 400

The number of available new media (second value) is determined as follows:

$$\text{(the number of available new media)} = \\ \text{(cumulative sum of reusable media having been used)}/ \\ \text{((target number of times of reuse of a medium)} - \\ \text{(cumulative sum of new media having been used)} = \\ 400/3 - 100 = 33$$

As described above, the embodiment may also be implemented such that, even if the upper limit of the quantity of new media available to a user is reached, the user is allowed to use new media until a result obtained from this calculating formula becomes a negative value.

A specific example of the operation of the eco-print system 1 will now be described with reference to flowcharts and other drawings. A program installed in advance on an auxiliary storage of a device is loaded into a memory of the device and the loaded program is executed by a processor of the device, and then the program works cooperatively with each hardware section of the device, thereby realizing control explained in the flowchart of each drawing. In the description given below, a device is shown as one that is mainly responsible for operation explained in the corresponding flowchart of each drawing. However, the actual situation is such that software (program) and hardware work cooperatively to realize each process.

Figure 3:
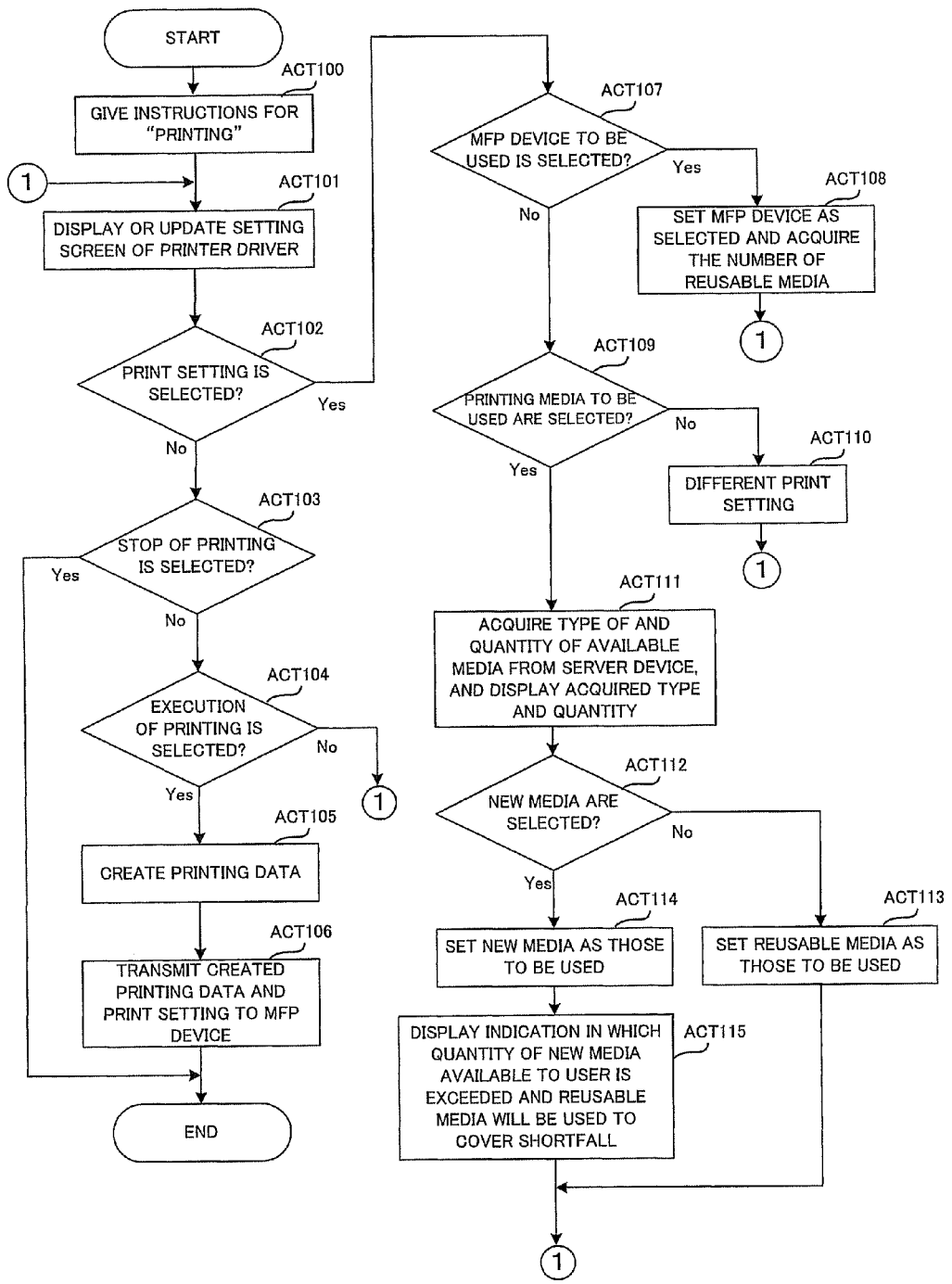
FIG. 3 is a flowchart explaining an example of the operation of a client PC.

FIG. 3 shows a flow of operation of the client PCs 50 and 60. While the operation explained in the following description is performed by the client PC 50, the client PC 60 performs the same operation as the client PC 50.

A user creates document data by using a document creation application and the like installed in advance on an auxiliary storage 504 of the client PC 50. The user gives instructions for printing to the client PC 50 (ACT 100). Then, the user makes necessary settings for printing on a setting screen of a printer driver.

The client PC 50 inquires the server device 40 about the quantity of media available to the user for each type of media, and acquires the quantities. The acquired values are displayed on the setting screen (ACT 101)

Next, the user selects print setting (ACT 102, Yes), and selects an MFP device to execute printing (ACT 107, Yes). The client PC 50 inquires about the number of reusable media available in the selected MFP device, and acquires the number (ACT 108). Then, the process flow returns to ACT 101 to perform processes of from ACT 101 to ACT 107. If media to be used are selected (ACT 109, Yes) after the determination in ACT 107 is denied, the client PC 50 presents the acquired quantities on the setting screen (ACT 111)

Next, the user selects "new media" or "reusable media" in the selection of "media to be used" (ACT 112). If "media to be used" selected at this time are new media (ACT 112, Yes), the client PC 50 makes setting on transmission data indicating that media to be used are new media (ACT 114). If the quantity of available new media is exceeded, the client PC 50 displays or notifies indication in which reusable media will be used (ACT 115). Meanwhile, if "media to be used" selected are reusable media (ACT 112, No), the client PC 50 makes setting on transmission data indicating that media to be used are reusable media (ACT 113). The process flow returns to ACT 101 after ACT 113 and ACT 115 are performed.

If execution of printing is selected (ACT 104, Yes) after the aforementioned necessary settings are made, the client PC 50 converts the document data to data in a print format with which the MFP device 20 (ACT 105) can comply, and transmits print setting data thereby set to the MFP device 20 (ACT 106).

If print setting is not selected in ACT 102 (ACT 102, No), determination is made as to if stop of printing was selected (ACT 103). If stop of printing is selected (ACT 103, Yes), the process flow is terminated. If the determination in ACT 103 is denied (ACT 103, No), the process flow proceeds to ACT 104. If execution of printing is not selected in ACT 104 (ACT 104, No), the process flow returns to ACT 101. If media to be used are not selected in ACT 109 (ACT 109, No), the operation shifts to different setting process (ACT 110).

The operation of the MFP device 10 having a decolorizing function and the MFP device 20 in copying process will now be described by referring to FIG. 4. While the operation explained in the following description is performed by the MFP device 20, the MFP device 10 having a decolorizing function performs the same operation as the MFP device 20.

A user performs authentication process at the MFP device 20 (ACT 200), and selects copying process. The user authentication process of the embodiment is realized by entry of a user's ID and a password using the operational panel 214. The user authentication process may also be realized on the basis of a read value obtained by making a card reader read an authentication card the user has. Or, biometric authentication may also be employed.

Figure 5:
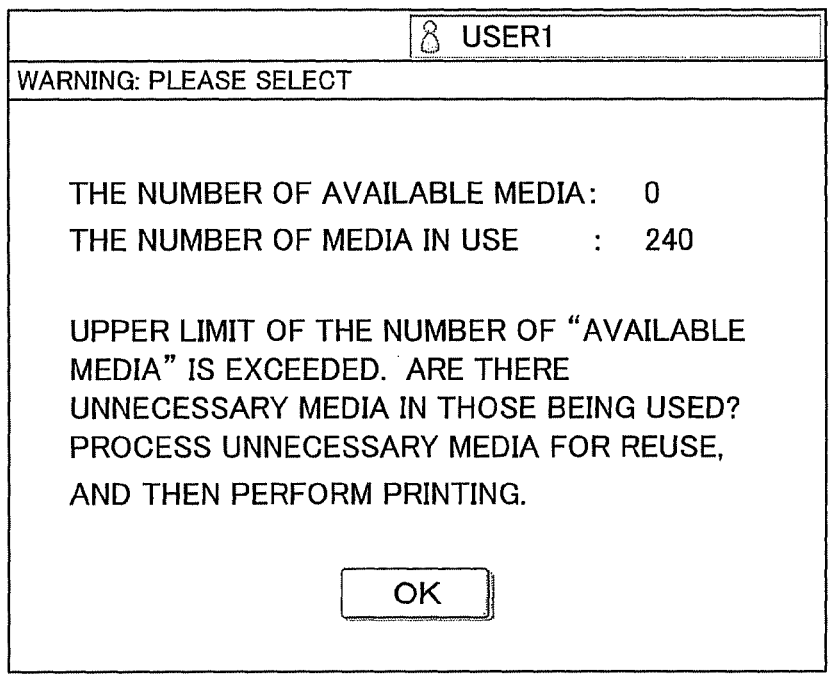
FIG. 5 shows an example of a message prompting a user to decolorize a medium in use, displayed on the MFP device having a decolorizing function and the MFP device.

The MFP device 20 inquires the server device 40 about the quantity of media available to the user for each type of media, and acquires the quantities (ACT 201). The MFP device 20 displays the acquired values on a setting screen of the operational panel 214. At the same time, if the number of available media is exceeded (ACT 202, Yes), the MFP device 20 displays and notifies indication in which copying is suspended until decolorizing process is performed on a medium in use (ACT 203). The threshold determination (1-1) or (1-2) in the first control, or the threshold determination (2-2) in the second control is made in ACT 202. Indication shown in FIG. 5 is displayed in ACT 203, for example.

If the number of available media poses no problems (ACT 202, No), the MFP device 20 determines if stop of copying was selected (ACT 204) and if execution of copying was selected (ACT 205). If both the determinations are denied, the MFP device 20 determines if copy setting was selected (ACT 206). If the determination in ACT 204 is affirmed (ACT 204, Yes), the process flow is terminated.

If copy setting is selected (ACT 206, Yes), the MFP device 20 then determines if the user selected media to be used (ACT 208). If the user selects media to be used (ACT 208, Yes), the MFP device 20 displays the type and the quantity of media available to the user (ACT 210).

Figure 6:
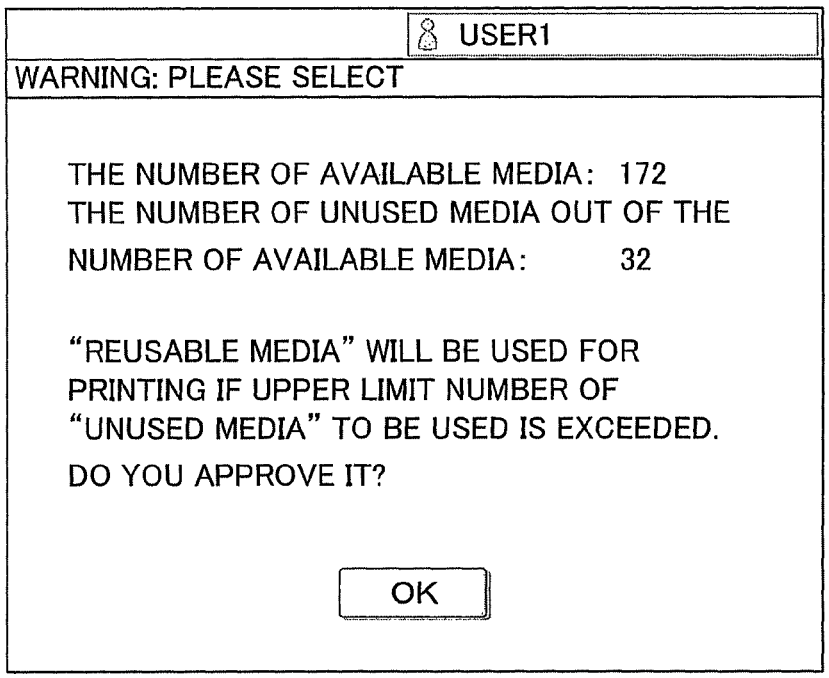
FIG. 6 shows an example of notification displayed on the MFP device having a decolorizing function and the MFP device about operation to be taken if the quantity of new media having been used exceeds an admissible quantity.

Here, settings are made about a color mode, the number of copies, and the presence or absence of finishing process. If necessary, the user selects "new media" or "reusable media" in the selection of "media to be used" being one of setting items for copying. "Reusable media" are selected by default. If the selected "media to be used" are reusable media (ACT 211, No), the MFP device 20 makes setting such that reusable media become media to be used (ACT 212). Then, the process flow returns to ACT 201. Meanwhile, if the selected "media to be used" are new media (ACT 211, Yes), the MFP device 20 makes setting such that new media become media to be used (ACT 213). If the quantity of available new media is exceeded, the MFP device 20 displays or notifies indication in which reusable media will be used (ACT 214). At this time, the operational panel 214 of the MFP device 20 displays indication shown in FIG. 6, for example. After ACT 214 is performed, the process flow returns to ACT 201.

After the aforementioned necessary settings are made, the MFP device 20 performs ACTs 201 to 204. Then, if execution of copying is selected (ACT 205, Yes), the scanner unit 218 of the MFP device 20 scans a document and performs image process required for copying to create print image data (ACT 215).

The MFP device 20 selects media to be used based on the value set in the "media to be used," and performs printing process on the created print image data. The operation in the printing process will be described below.

If reusable media are selected (ACT 216, No), the MFP device 20 proceeds to next process in ACT 217. The MFP device 20 generates a medium's ID, converts the medium's ID thereby generated to an image readable by a machine such as a QR code and a bar code, and synthesizes this image and the print image data created in ACT 215.

Figures 7, 8:
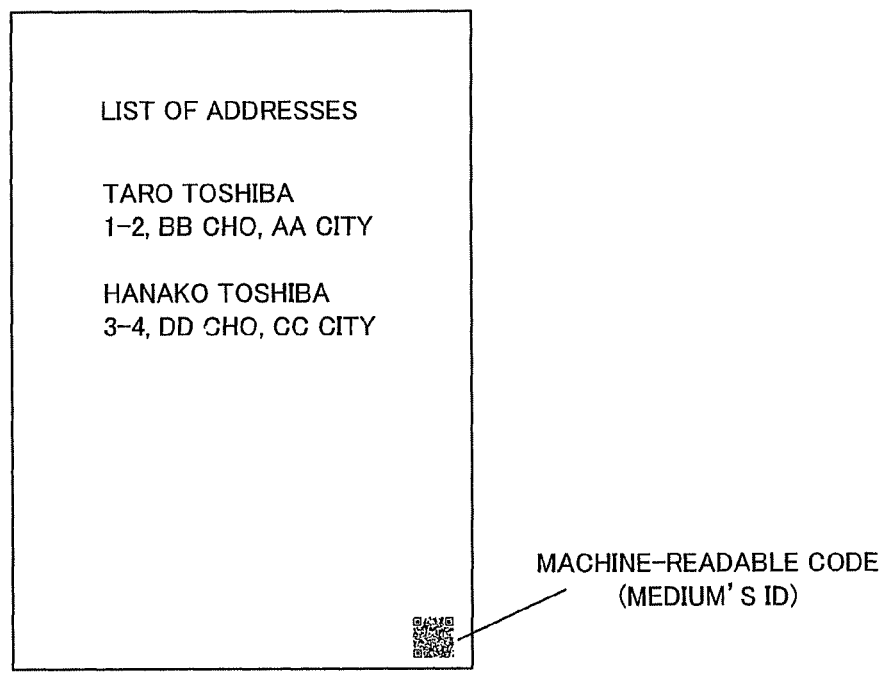
FIG. 7 shows an example of a medium's ID.
FIG. 8 shows an example of a machine-readable code corresponding to a medium's ID and an example of the position of the code formed on a medium.

FIG. 7 is an example of the format of a medium's ID. FIG. 8 shows the position of a QR code affixed on a medium. The medium's ID is composed of a combination of a device code such as a device name capable of specifying a device uniquely, and a serial code of the medium. The serial code of the medium is a value obtained by making count-up each time a medium is output from the device. The medium's ID is converted to a QR code or a bar code, and is affixed on a margin at an end portion of the medium.

Subsequently, the processor 211 of the MFP device 20 controls the operation of the conveying motor unit 219 in ACT 217 such that a medium is conveyed from a tray housing reusable medium. Then, the synthesized image data is transferred to the printer unit 216 of the MFP device 20, and the synthesized image data is printed with a decolorable toner. After the printing, the MFP device 20 counts up the number of media having been used. In ACT 217, the number of reusable media having been used is counted up.

Next, the MFP device 20 determines if copying process of data to be processed was finished (ACT 218) and determines if reusable media have run out (ACT 219). In this manner, the MFP device 20 repeats the aforementioned process in ACT 217 until there exists no data to be processed or until reusable media have run out (loop formed if a result of ACT 218 is No and a result of ACT 219 is No). If there exists no data to be processed (ACT 218, Yes), the number of reusable media having been used obtained by counting up, the medium's ID having been generated (if a plurality of media are processed this time, all media's IDs generated this time), and the user's ID to the server device 40 (ACT 227), and the process flow is terminated. If the determination in ACT 219 is confirmed, the process flow proceeds to process described later.

If new media are selected (ACT 216, Yes), the MFP device 20 proceeds to process about a new medium in the same manner as ACT 217. To be specific, in ACT 222, the MFP device 20 generates a medium's ID, synthesizes the medium's ID and a QR code (or a bar code), and makes a print on a new medium. Then, the MFP device 20 counts up the number of new media having been used. If process of data to be processed was finished (ACT 223, Yes), the MFP device 20 notifies the server device 40 of the quantity of new media having been used, the medium's IDs, and the user's ID (ACT 227). Meanwhile, if process of data to be processed has not been finished (ACT 223, No), the MFP device 20 determines if the upper limit of available new media has been exceeded (ACT 224). The threshold determination (2-1) in the second control, or the threshold determination in the third control is made in ACT 224. If the upper limit is not exceeded (ACT 224, No), the process flow returns to ACT 222.

If the determination in the third control is applied to ACT 224, the MFP device 20 calculates the number of available new media (second value) by using the calculating formula given in the third control, and makes determination based on if the calculated value is a negative value or not. If the calculated value is a negative value, the determination in ACT 224 is affirmed. If the calculated value is not a negative value, the determination in ACT 224 is denied.

If selected media have run out (ACT 219, Yes) or if the upper limit of the quantity of media available to the user is exceeded (ACT 224, Yes) during printing process for copying, the MFP device 20 continues printing process by using alternate media (ACTS 220 and 225). To be specific, if media selected by the user are reusable media and if reusable media have run out (ACT 219, Yes), the MFP device 20 performs process on a new medium including generation of a medium's ID, synthesis of images, printing process, and count-up of the number of new media having been used (ACT 220). Meanwhile, if media selected by the user are new media and if the upper limit of use thereof has been exceeded (ACT 224, Yes), the MFP device 20 performs process on a reusable medium including generation of a medium's ID, synthesis of images, printing process, and count-up of the number of reusable media having been used (ACT 225).

Regarding count-up in ACT 225, the number of reusable media having been used is counted up after media to be used are switched. Meanwhile, if media to be used are switched from reusable media to new media (corresponding to the case of ACT 220), the number of new media having been used is required to be counted up by definition after the switching. In this case, however, use of new media is against user's will, and the user uses new media for the reason that reusable media have run out caused by the circumstances of the system and the number of media. Thus, in the present embodiment, the number of media having been used is not counted up as the number of new media as it may impose limitations on the use of new media. Instead, the number of media having been used is counted up as the number of presumptive reusable media handled separately from new media and reusable media.

Regardless of if the process flow proceeds to ACT 220 or 225, the MFP device 20 repeats ACT 220 or 225 (ACT 221, No or ACT 226, No) until process of data to be processed is finished. If process of data to be processed is finished (ACT 221, Yes or ACT 226, Yes), the MFP device 20 transmits the counted up numbers of reusable media, new media and presumptive media having been used and a medium's ID having been generated to the server device 40 (ACT 227). Then, the process flow is terminated.

If the determination in ACT 206 or 208 is denied (ACT 206, No or ACT 208, No), the MFP device 20 performs different process (ACT 207 or 209). Then, the process flow returns to ACT 201.

Figure 9:
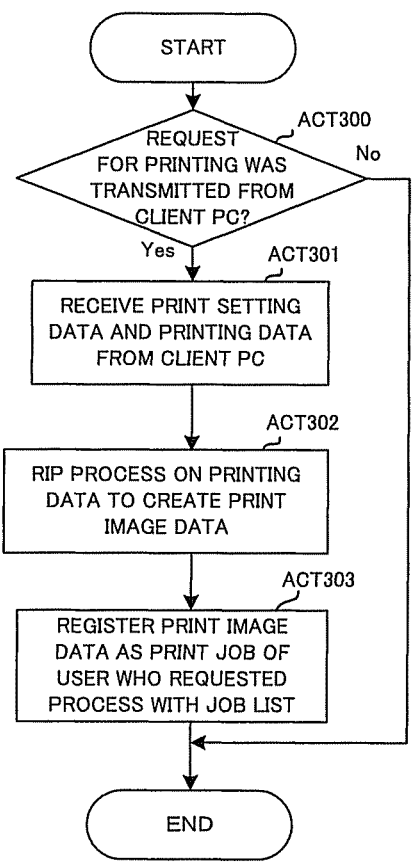
FIG. 9 is a flowchart explaining an example of the operation of the MFP device having a decolorizing function and that of the MFP device in response to receipt of a print job.

Operation to make a print of printing data transmitted from the client PC 50 or 60 will now be described by referring to FIGS. 9 and 10. Data transmission from the client PCs 50 and 60 has already been described by referring to FIG. 3.

First, the operation of the MFP device 10 having a decolorizing function and the MFP device 20 in response to receipt of a print job will be described by referring to FIG. 9. While the operation described below is performed by the MFP device 20, the MFP device 10 having a decolorizing function performs the same operation as the MFP device 20.

The MFP device 20 receives a request for printing by an electronic message from the client PC 50 or 60 (ACT 300, Yes). The MFP device 20 thereafter receives data about a print format and print setting data (ACT 301). The MFP device 20 performs RIP (raster image processing) on the print format data to create print image data (ACT 302). The MFP device 20 registers the print image data thereby created and the print setting data with a job list stored in the memory 212 or the auxiliary storage 213 (ACT 303).

Next, the printing operation of the MFP device 10 having a decolorizing function and the MFP device 20 performed after receipt of a print job will be described by referring to FIG. 10. While the operation described below is performed by the MFP device 20, the MFP device 10 having a decolorizing function performs the same operation as the MFP device 20.

The MFP device 20 performs process to authenticate a user who is to use the MFP device 20 (ACT 400). Then, the MFP device 20 inquires the server device 40 about the quantity of media available to the user for each type of media, and acquires the quantities (ACT 401). The MFP device 20 displays the acquired values on a setting screen on the operational panel 214. At the same time, if the number of available media is exceeded (ACT 402, Yes), the MFP device 20 displays and notifies indication in which printing is suspended until decolorizing process is performed on a medium in use (ACT 403). Then, the process flow is terminated. The threshold determination (1-1) or (1-2) in the first control, or the threshold determination (2-2) in the second control is made in ACT 402. If the number of available media poses no problems (ACT 402, No), the MFP device 20 retrieves jobs of the user authenticated by the user authentication from the job list, and displays the retrieved jobs on the operational panel 214 (ACT 404). The user selects a job for which the user desires to make a print from the jobs displayed in list form (ACT 405). Next, if stop of printing is not selected (ACT 406, No), and if execution of printing is selected (ACT 407, Yes), the MFP device 20 determines the presence or absence of a registered print job (ACT 409). If stop of printing is selected (ACT 406, Yes), the process flow is terminated. If execution of printing is not selected (ACT 407, No), the MFP device 20 performs different process (ACT 408). Then, the process flow returns to ACT 401.

If it is determined in ACT 409 that there is no selected print job (ACT 409, No), the process flow returns to ACT 401. If it is determined in ACT 409 that there is a selected print job (ACT 409, Yes), the MFP device 20 retrieves print setting data from this print job to acquire a set value related to "media to be used." If this set value indicates new media (ACT 410, Yes), the process flow proceeds to ACT 416. If this set value indicates reusable media (ACT 410, No), the process flow proceeds to ACT 411. Then, processes in ACTs 411 to 421 are performed. The MFP device 20 operates in the same manner to perform the processes in ACTs 411 to 421 as it operates to perform the processes in ACTs 217 to 227 of FIG. 4, except that the processes in ACTs 411 to 421 are intended for printing process. Accordingly, processes in ACTs 411 to 421 are not described again.

Figure 11:
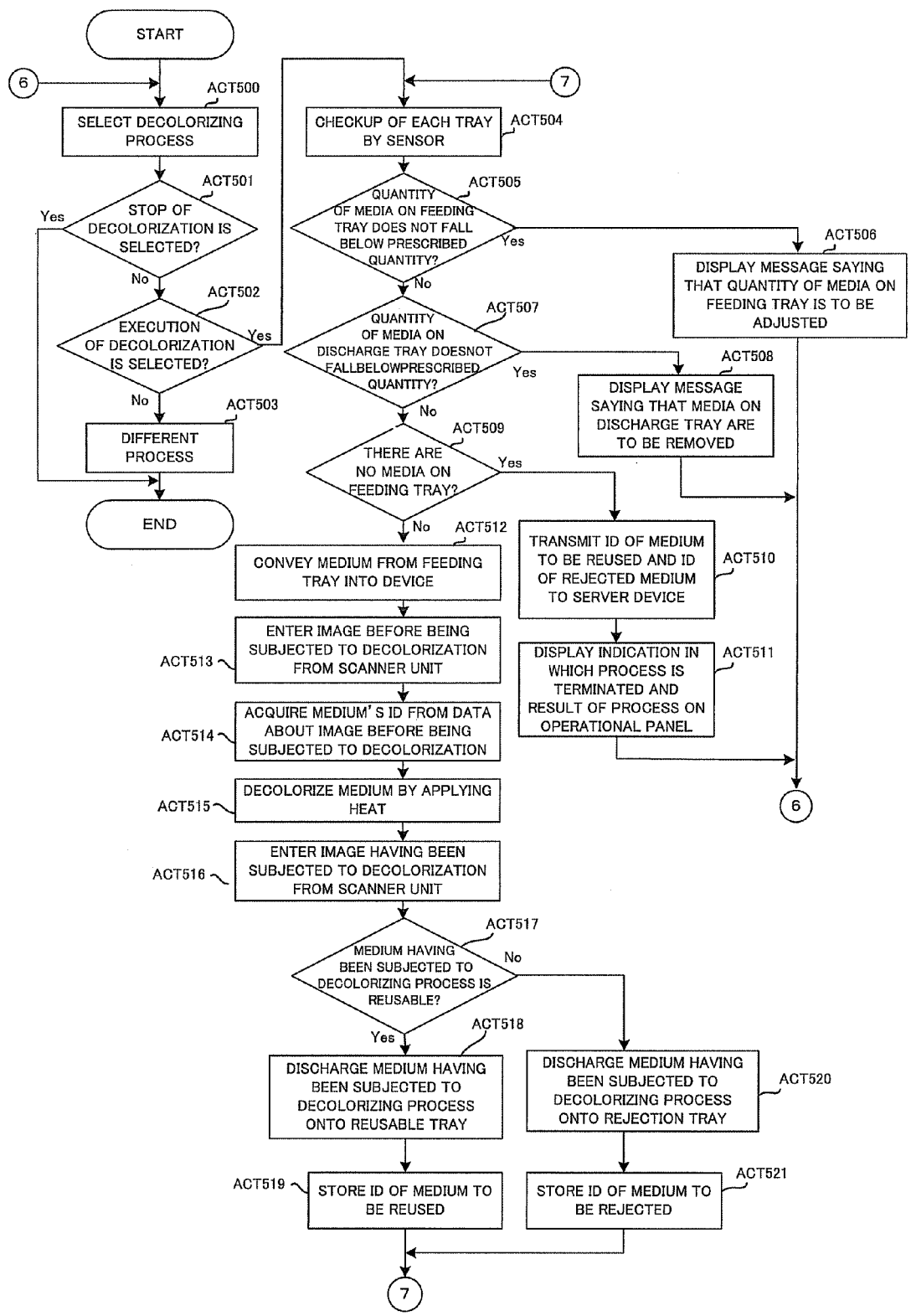
FIG. 11 shows an example of the operation of the MFP device having a decolorizing function and a decolorizing device.

The operation of the MFP device 10 having a decolorizing function and the decolorizing device 30 will now be described by referring to FIG. 11. While the operation described below is performed by the decolorizing device 30, the MFP device 10 having a decolorizing function performs the same operation as the decolorizing device 30.

The decolorizing device 30 determines if decolorizing process was selected (ACT 500). If decolorizing process was selected, the decolorizing device 30 determines if decolorizing process was stopped (ACT 501) and if execution of decolorizing process was selected (ACT 502). If decolorizing process was stopped (ACT 501, Yes), the process flow is terminated. If execution of decolorizing process was not selected (ACT 502, No), the decolorizing device 30 performs different process (ACT 503), and then the process flow is terminated.

If the determination in ACT 501 is denied and if the determination in ACT 502 is affirmed, the decolorizing device 30 causes the sensor unit 317 to check the quantity of media on a feeding tray holding thereon media to be decolorized, and the quantity of media on a discharge tray (reusable tray or rejection tray) onto which media having been subjected to decolorization are discharged (ACT 504). If the quantity of media on the feeding tray does not fall below a prescribed quantity (ACT 505, Yes), the decolorizing device 30 displays a message on the operational panel 314 saying that the quantity of media on the feeding tray is to be adjusted (ACT 506). Then, the process flow returns to ACT 500. If the determination in ACT 505 is denied and if the quantity of media on the discharge tray does not fall below a prescribed quantity (ACT 507, Yes), the decolorizing device 30 displays a message on the operational panel 314 saying that media on the discharge tray are to be removed (ACT 508). Then, the process flow returns to ACT 500. If the determination in ACT 507 is denied (ACT 507, No), the decolorizing device 30 thereafter determines the presence of absence of a medium on the feeding tray (ACT 509).

If there is a medium on the feeding tray (ACT 509, Yes), the decolorizing device 30 controls drive of the conveying motor unit 319 to convey the medium from the feeding tray into the device (ACT 512). The scanner unit 318 reads a contents image on the medium thereby conveyed before the contents image is subjected to decolorization (ACT 513), and acquires a management ID (QR code) (ACT 514). Electronic data about the contents image thereby obtained is reduced or compressed, and is then transmitted as a log image to the server device 40 and stored in the server device 40. Next, the decolorizing unit 320 applies heat to the medium to decolorize the contents image and the medium's ID (QR code) (ACT 515). The scanner unit 318 thereafter reads an image again after the medium is subjected to decolorization (ACT 516). At this time, the decolorizing device 30 determines if the medium is reusable or not on the basis of the image read after the decolorization (ACT 517).

The medium is discharged onto an appropriate discharge tray according to the determination result. To be specific, if the medium is reusable (ACT 517, Yes), the decolorizing device 30 discharges the medium having been subjected to decolorizing process onto the reusable tray (ACT 518), and stores the ID of the medium to be reused into the auxiliary storage 313 (ACT 519). If the medium is not reusable (ACT 517, No), the decolorizing device 30 discharges the medium having been subjected to decolorizing process onto the rejection tray (ACT 520), and stores the ID of the medium to be rejected into the auxiliary storage 313 (ACT 521). After the processes in ACT 519 or 521 are performed, the process flow returns to ACT 504.

The quantities of media on the trays are checked in ACT 504, and the determinations are made in ACTS 505 and 507. Then, if it is determined in ACT 509 that there is no medium on the feeding tray (ACT 509, Yes), the decolorizing device 30 transmits the ID of the medium to be reused and the ID of the medium to be rejected stored in the auxiliary storage 313 to the server device 40 (ACT 510). The decolorizing device 30 displays indication in which the process flow is terminated and an output of the processes (the numbers of reusable and rejected media) on the operational panel 314 (ACT 511). After ACT 511 is performed, the process flow returns to ACT 500.

In the case of the decolorizing device 30, reusable media are required to be moved to the MFP device 20 at regular intervals. However, this is not required in the case of the MFP device 10 having a decolorizing function. For move of reusable media, it is required to move all media on a storing tray in order to conduct a reset.

Finally, management data stored in the server device 40 and the operation of the server device 40 will be described. The management data stored in the server device 40 shown in FIGS. 12 to 16 are described first.

FIG. 12 shows a table (data) containing the ID of a printed medium, the ID of a user who is using this medium, and date and time of use, for example, of the MFP device 10 having a decolorizing function or the MFP device 20 that are associated with each other. A printed matter (medium's ID) currently in use and a user who is using this printed matter can be seen from this table. A medium registered with this table is in the condition of the media B shown in FIG. 1. A record to be registered with this management table is created each time a user makes a copy or a print on a medium, namely, each time a medium's ID is transmitted, for example, from the MFP device 20. Each time a medium's ID is received from the decolorizing device 30, a corresponding record is deleted from this table.

FIG. 13 shows a management table containing a cumulative sum of new media having been used (first value), a cumulative sum of reusable media having been used, and the number of media having been subjected to decolorizing process that are recorded for each user. Each value registered with this table is used to limit use of media by a user. Cumulative sums of new media and reusable media having been used registered with this management table are updated each time the quantity of media having been used is received from the MFP device 10 having a decolorizing function or the MFP device 20. The number of media having been subjected to decolorizing process is updated each time the ID of a reusable or rejected medium is received from the MFP device 10 having a decolorizing function or the decolorizing device 30. Each time a new user is added, a new record is created and registered with the management table of FIG. 13. A record of a user is deleted from this management table when the user stops using the system.

FIG. 14 shows a table containing an admissible storage capacity of a storing tray of each of an MFP device having a decolorizing function, an MFP device, and a decolorizing device belonging to the system. The admissible number of new media to be stored (maximum number of new media to be stored) and the admissible number of reusable media to be stored (maximum number of reusable media to be stored) are registered for each device in association with each other. In FIG. 14, a device identified by an ID "MFPnn" (nn is a number) is an MFP device having a decolorizing function or an MFP device, and a device identified by an ID "ERSnn" (nn is a number) is a decolorizing device. Each record in the management table of FIG. 14 is set in advance before the system is put into operation. If a new device is added to the system or a device is removed from the system, a record about the new device is added or a record about the removed device is deleted.

FIG. 15 shows a table containing a parameter entered by a system administrator. The parameter registered with this table includes the lower and upper limits of a varying margin, a target number of times of reuse of a medium, and the number of users. These values are set before the system is put into operation, and are updated if necessary.

FIG. 16 shows a table containing the number (cumulative sum) of media used in the entire system. This table contains a cumulative sum of new media having being used, a cumulative sum of presumptive reusable media having been used, a cumulative sum of reusable media, and a cumulative sum of rejected media. Each value registered with this table is updated each time the quantity of media having been used is received from the MFP device 10 having a decolorizing function or the MFP device 20, and is updated each time the ID of a reusable or rejected medium is received from the decolorizing device 30.

Use of the tables shown in FIGS. 12 to 16 makes it possible to calculate a duration of use of a medium, specify a medium not having been subjected to decolorizing process, and analyze a relationship between devices in terms of their conditions of use, for example.

Figure 17:
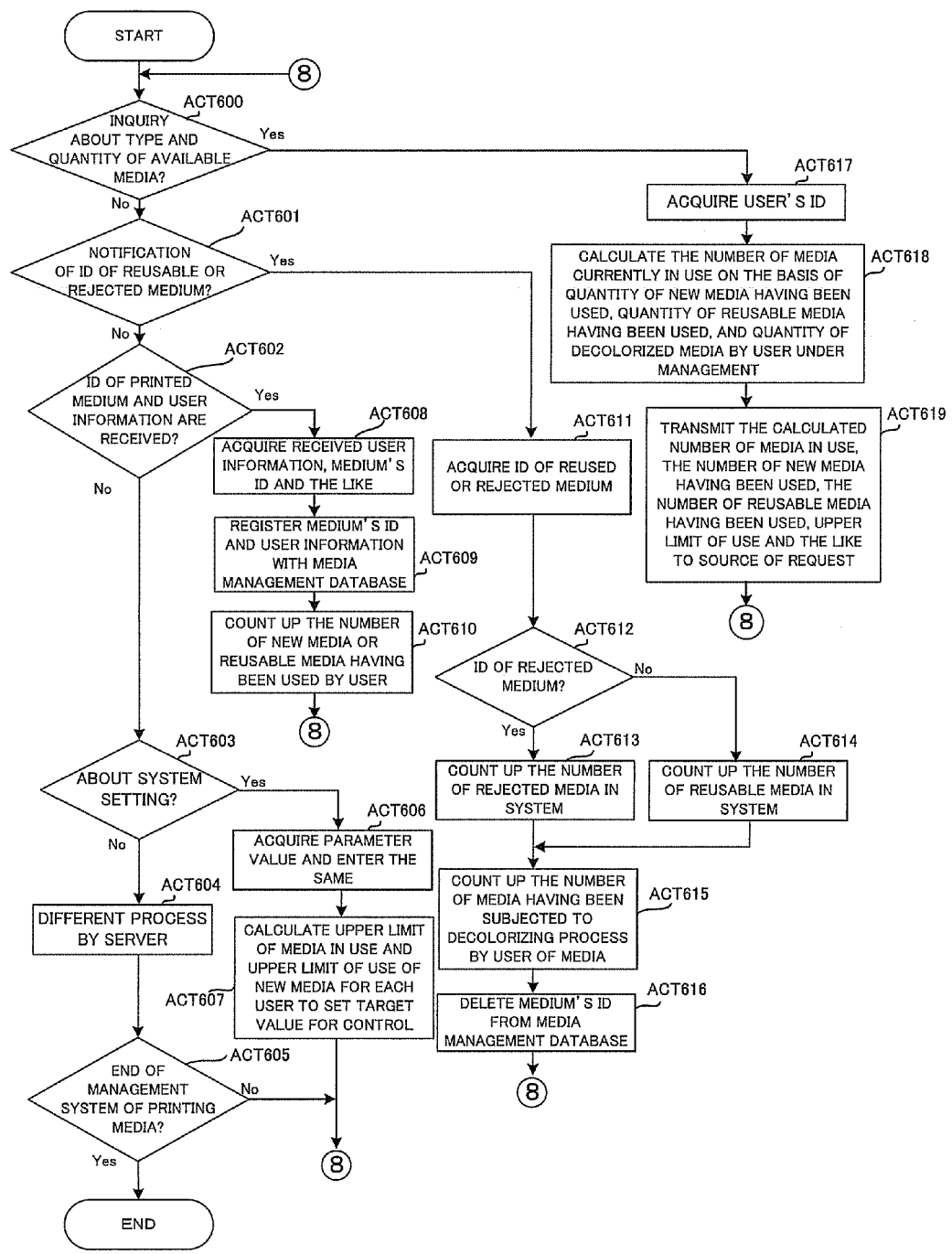
FIG. 17 is a flowchart explaining an example of the operation of the server device.

FIG. 17 is a flowchart explaining an example of the operation of the server device 40. The server device 40 operates in response to an electronic message transmitted from the client PC 50 or 60, from the MFP device 10 having a decolorizing function or the MFP device 20, or from the decolorizing device 30.

If the received electronic message is one from the client PC 50 or 60, or from the MFP device 10 having a decolorizing function or the MFP device 20, and if the received electronic message is an inquiry about the type and the quantity of available media (ACT 600, Yes), the server device 40 acquires a user's ID from the received electronic message (ACT 617). Then, the server device 40 retrieves a cumulative sum of new media having been used, a cumulative sum of reusable media having been used, and the number of decolorized media corresponding to the user's ID from the table of FIG. 13, and calculates the number of media currently in use (the number of media in user's use) (ACT 618). The number of media currently in use can also be obtained from the number of records containing this user's ID registered with the table of FIG. 12. The server device 40 transmits to the source of request data containing the calculated number of media in use, a cumulative sum of new media having been used and a cumulative sum of reusable media having been used retrieved from the table of FIG. 13, and the upper limit of use (including the upper limit of the quantity of media available to the user (first threshold) and the upper limit of the quantity of new media available to the user (second threshold)) (ACT 619). At this time, the server device 40 also transmits data used to make the determinations in the first to third controls such as the numerical values about the relevant device shown in FIG. 14, and the upper and lower limits of a margin relating to each numerical value, for example.

If the determination in ACT 600 is denied, and further, if the received electronic message is a notification of the ID of a reusable or rejected medium transmitted from the decolorizing device 30 (or MFP device 10 having a decolorizing function) (ACT 601, Yes), the server device 40 acquires the ID of the reusable or rejected medium from the electronic message (ACT 611). If the acquired ID is the ID of a rejected medium (ACT 612, Yes), the server device 40 counts up the number of rejected media in the management table about the entire system shown in FIG. 16 (ACT 613). Then, the process flow proceeds to ACT 615. Meanwhile, if the acquired ID is the ID of a reusable medium (ACT 612, No), the server device 40 counts up the number of reusable media in the management table about the entire system shown in FIG. 16 (ACT 614). Then, the process flow proceeds to ACT 615.

Next, the server device 40 counts up the number of media having been subjected to decolorizing process by a user of media shown in FIG. 13 (ACT 615). This process will be described below. The server device 40 searches the table shown in FIG. 12 with the ID of a medium acquired in ACT 611 to acquire the ID of a user who used this medium. Then, the server device 40 searches the table shown in FIG. 13 with the user's ID thereby acquired, and counts up the number of media having been subjected to decolorizing process by the user with the user's ID found by the search.

Next, the server device 40 deletes a record about this medium's ID from the table of FIG. 12 (ACT 616).

If the determination in ACT 601 is denied, and further, if the received electronic message is one from the MFP device 20 (or MFP 10 device having a decolorizing function) informing the quantity of media, a medium's ID and a user's ID (ACT 602, Yes), the server device 40 acquires the medium's ID and an ID of a user from the electronic message (ACT 608). The server device 40 adds date and time of use to the medium's ID and the user's ID to create one record, and registers the record with the table shown in FIG. 12 (ACT 609). The server device 40 counts up a cumulative sum of new media or reusable media having been used by the user as shown in FIG. 13 (ACT 610). At this time, the server device 40 also makes count-up in the table about the entire system shown in FIG. 16. In the present embodiment, a number about a presumptive reusable medium is not added to any data of FIG. 13. However, a column to manage the number of presumptive reusable media may be provided in the table of FIG. 13.

If the received electronic message does not relate to any of the aforementioned processes but it relates to setting process by a system administrator (ACT 603, Yes), the server device 40 acquires a parameter entered by the system administrator (ACT 606). Then, the server device 40 calculates a threshold of the upper limit of media in use and a threshold of the upper limit of use of new media for each user as described above to set a target value for control (ACT 607). These thresholds thereby calculated are stored in the auxiliary storage 404, and are retrieved if necessary.

If the determination in ACT 603 is denied, the server device 40 performs different process (such as system setting to allow monitoring of the condition of use of media and process to display a status) (ACT 604).

The server device 40 finishes its operation when the eco-print system 1 ends (ACT 605, Yes). In the present embodiment, after ACTs 619, 610, 616 and 607 are performed, and if the determination in ACT 605 is denied, the process flow returns to ACT 600.

In the example shown in the present embodiment, a medium's ID is printed on a medium. However, the embodiment can also be implemented such that only the number of processed media is counted and a medium's ID is not recorded on a medium. Further, in the example shown in the embodiment, the system is composed of a plurality of devices and a server device. However, the embodiment can also be implemented such that the system is a small-scale system composed of an MFP device having a function to manage the count of media (function of the server device 40).

Additionally, in the example shown in the embodiment, the quantity of media to be used by each user is limited. However, the embodiment can also be implemented naturally such that the quantity of media to be used by all users or the quantity of media to be used in the entire system is limited.

Figure 4:
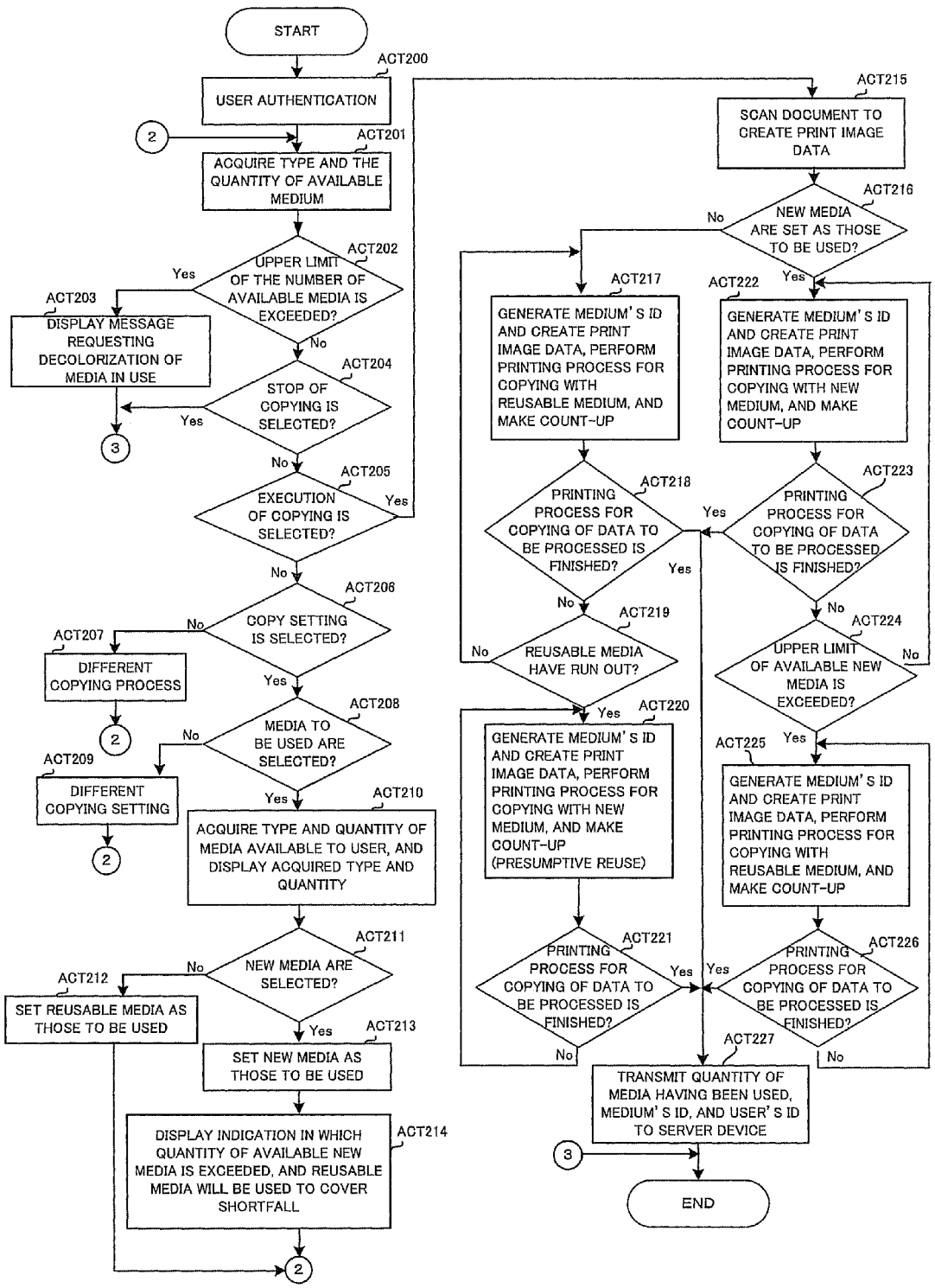
FIG. 4 is a flowchart explaining an example of the operation of an MFP device having a decolorizing function and that of an MFP device in copying process.
Figure 10:
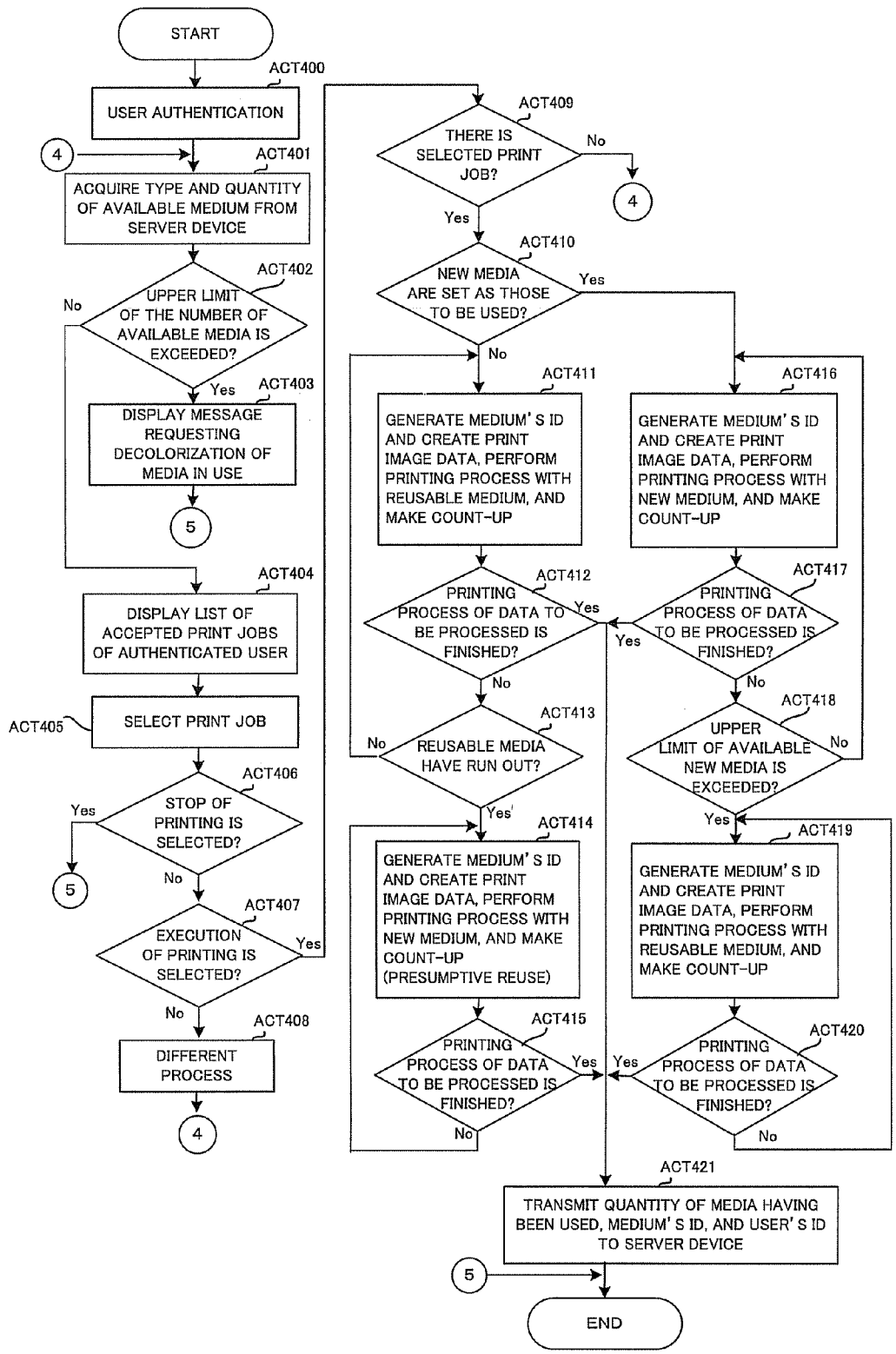
FIG. 10 explains an example of the operation of the MFP device having a decolorizing function and that of the MFP device to execute a print job.

In the present embodiment, the server device 40 transmits a numerical value held by the server device 40 itself, and the MFP device 10 having a decolorizing function or the MFP device 20 provides the aforementioned first, second or third control (threshold determination) by using the received numerical value (see ACTs 203, 219 and 224 of FIG. 4 and corresponding ACTs in FIG. 10). Alternatively, the embodiment may be implemented such that the server device 40 performs the threshold determinations explained in the aforementioned first to third controls, and transmits an electronic message to the MFP device 10 having a decolorizing function or the MFP device 20 to control printing or indicate the acceptance of printing. In this case, the MFP device 10 having a decolorizing function or the MFP device 20 operates in response to the electronic message for control.

The image processing system corresponds to the eco-print system 1. An image forming unit corresponds to the MFP device 10 having a decolorizing function (especially the printer unit 116) and the MFP device 20 (especially the printer unit 216) A decolorizing unit corresponds to the MFP device 10 having a decolorizing function (especially the decolorizing unit 120) and the decolorizing device 30 (especially decolorizing unit 320).

A receiving unit corresponds to a network I/F in each device (especially the network interface I/F 406 in the server device 40). Data about the number of processes corresponds to a medium's ID and the number of processes handled in each device (count value) of the embodiment.

A controller corresponds to the server device 40, the MFP device 10 having a decolorizing function (especially the processor 111, the memory 112 and the auxiliary storage 113), the MFP device 20 (especially the processor 211, the memory 212 and the auxiliary storage 213), and the decolorizing device 30 (especially the processor 311, the memory 312 and the auxiliary storage 313).

A display unit corresponds to the operational panels 114 and 214. A transmitting unit corresponds to the network IFs 115 and 215.

The media B shown in FIG. 1 are in a condition after they are subjected to image formation by the image forming unit and before they are decolorized by the decolorizing unit. The media C shown in FIG. 1 are in a condition after they are decolorized by the decolorizing unit and before they are subjected to image formation by the image forming unit.

Regarding determination made by comparison with each threshold, if a numerical value targeted for determination is the same as the threshold, applicable determination is not limited to the case of the embodiment. As an example, threshold determination of the embodiment is made on the basis of if a numerical value targeted for determination "is the same as or higher than a threshold." In this case, the determination can be made on the basis of if the targeted numerical value "surpasses" or "exceeds" the threshold, and vice versa. This also applies to the case where threshold determination is made on the basis of if a numerical value targeted for determination "is the same as or smaller than a threshold" or "does not exceed the threshold." In this case, the determination can be made on the basis of if the targeted numerical value "falls below the threshold" or "is smaller than the threshold," and vice versa. These are equivalent issues capable of being replaced easily in the embodiment.

Employing the structure of the embodiment controls the quantity of new media to be used, thereby making it possible to control the total quantity media to be used in the system and to suppress use of media in a manner by which the capacity of a storing tray of an MFP device or a decolorizing device to hold media is exceeded considerably. Further, a user is notified of the presence of a medium that is not being reused by the user to bring the media back to the cycle of reuse. This avoids use of media by the user more than what is necessary to cut down on waste of material consumption.

As described in detail above, the technique described herein is capable of suppressing the quantity of media to be used by a user.

While certain embodiments have been described, these embodiments have been presented by way of example only, and are not intended to limit the scope of invention. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. An image processing system, comprising:
a receiving unit configured to receive data about the number of processes performed in an image forming unit to form an image on a medium with a decolorable color material and data about the number of processes performed in a decolorizing unit to decolorize an image on a medium formed with the decolorable color material, and
a controller configured to calculate the number of media in user's use in a condition after they are subjected to image formation by the image forming unit and before they are decolorized by the decolorizing unit on the basis of the data received by the receiving unit, deter image formation by the image forming unit if the number of the media in user's use exceeds a previously set first threshold, and allow the image forming unit to form an image if the number of the media in user's use does not exceed the first threshold,
wherein the number of the media in user's use and the first threshold are numerical values defined for each user of the image processing system, and the controller provides the control of deterrent and the control of allowance for each user of the image processing system.

2. The image processing system according to claim 1, further comprising a display unit configured to display a message prompting the user to decolorize the media in user's use if the number of the media in user's use exceeds the first threshold.

3. The image processing system according to claim 1, further comprising the image forming unit, and wherein
the image forming unit forms an image on a new medium being an unused medium or on a reusable medium being a medium in a condition after an image thereon is decolorized by the decolorizing unit.

4. The image processing system according to claim 3, wherein the controller is further configured to deter image formation on a new medium by the image forming unit if a first value exceeds a previously set second threshold, the first value indicating the number of new media having been used for image formation.

5. The image processing system according to claim 4, wherein if the first value exceeds the second threshold, the image forming unit uses a reusable medium for subsequent image formation.

6. The image processing system according to claim 5, further comprising a display unit configured to display, when setting is made to form an image on a new medium by a user, a message suggesting use of a reusable medium if a value limiting use of a new medium is exceeded.

7. The image processing system according to claim 3, wherein if reusable media have run out during image formation using a plurality of reusable media, the image forming unit uses a new medium for subsequent image formation.

8. The image processing system according to claim 1, wherein the first threshold is calculated on the basis of an admissible number of storage of a tray to hold reusable media in a condition after images thereon are decolorized by the decolorizing unit.

9. The image processing system according to claim 8, wherein the admissible number of storage of the tray is previously given a margin, and the first threshold is calculated on the basis of an upper limit of the margin of the admissible number of storage of the tray.

10. The image processing system according to claim 4, wherein the second threshold is calculated on the basis of the first threshold and a value defining an upper limit of the number of times of decolorization of one medium.

11. The image processing system according to claim 3, wherein the controller calculates a second value by dividing a cumulative sum of reusable media having been used by a value defining an upper limit of the number of times of decolorization of one medium, and subtracting a cumulative sum of new media having been used from a resultant value of the division, and if the second value is a negative value, deters image formation on a new medium by the image forming unit.

12. The image processing system according to claim 3, further comprising the decolorizing unit, and wherein
the image forming unit forms an identification code of a medium on the medium each time the image forming unit forms an image on the medium, counts the number of new media having been used and the number of reusable media having been used, and transmits the identification code of the medium, the number of new media having been used, and the number of reusable media having been used to the controller,
the decolorizing unit transmits an identification code of a medium having been subjected to decolorizing process to the controller, and
the controller calculates the number of the media in user's use on the basis of the number of new media having been used, the number of reusable media having been used and the identification code of the medium on which the image has been formed, which are transmitted from the image forming unit, and the identification code of the medium having been subjected to decolorizing process and transmitted from the decolorizing unit.

13. The image processing system according to claim 12, wherein if reusable media have run out during image formation using a plurality of reusable media, the image forming unit uses a new medium for subsequent image formation, and counts the number of media to be subjected to subsequent image formation separately from counting of the number of new media having been used and the number of reusable media having been used.

14. The image processing system according to claim 1, further comprising a display unit configured to display the first threshold and the number of the media in user's use.

15. The image processing system according to claim 1, further comprising the decolorizing unit, and wherein
the decolorizing unit is further configured to classify media having been subjected to decolorizing process into a reusable medium and a rejected medium, and discharges the reusable media and the rejected media separately onto respective trays.

16. The image processing system according to claim 4, wherein the controller is further configured to:
allow the image forming unit to form an image if a third value falls below a lower limit of an admissible capacity of a tray to hold reusable media and if the number of the media in user's use does not exceed the first threshold, the third value indicating the number of media in a condition after they are decolorized by the decolorizing unit and before they are subjected to image formation by the image forming unit;
deter image formation by the image forming unit if the third value falls below the lower limit of the admissible capacity of the tray and if the number of the media in user's use exceeds the first threshold;
in a condition where the third value exceeds the lower limit of the admissible capacity of the tray and where the number of the media in user's use does not exceed the first threshold, allow the image forming unit to form an image on a new medium if the first value does not exceed the second threshold and deter image formation on a new medium by the image forming unit if the first value exceeds the second threshold; and
deter image formation by the image forming unit if the third value exceeds the lower limit of the admissible capacity of the tray and if the number of the media in user' use exceeds the first threshold.

17. An image forming apparatus, comprising:
an image forming unit configured to form an image with a decolorable color material on a new medium being an unused medium or a reusable medium being a medium in a condition after it is decolorized by a decolorizing unit;
a transmitting unit configured to transmit a first count value and a second count value, the first count value being obtained by counting up when an image is formed on a new medium, the second count value being obtained by counting up when an image is formed on a reusable medium; and
a controller configured to deter image formation by the image forming unit if the number of media exceeds a previously set first threshold and allow the image forming unit to form an image if the number of the media does not exceed the first threshold, the number of the media being calculated on the basis of at least the first count value, the second count value, and a third count value obtained by counting up media having been subjected to decolorizing process.

18. The image forming apparatus according to claim 17, wherein the number of the media and the first threshold are defined for each user of the image forming apparatus, and the controller provides the control of deterrent and the control of allowance for each user of the image forming apparatus.

19. A method of controlling use of a medium applied in an image processing system including at least a controller, the image processing system forming an image on a medium with a decolorable color material and decolorizing an image on a medium formed with the decolorable color material, the method comprising deterring image formation if the number of media in user's use exceeds a previously set first threshold and allowing image formation if the number of the media in user's use does not exceed the first threshold, the media in user's use being in a condition after they are subjected to image formation and before they are decolorized, wherein the number of the media in user's use and the first threshold are numerical values defined for each user of the image processing system, and the controller provides the control of deterrent and the control of allowance for each user of the image processing system.

* * * * *